UNITED STATES PATENT OFFICE.

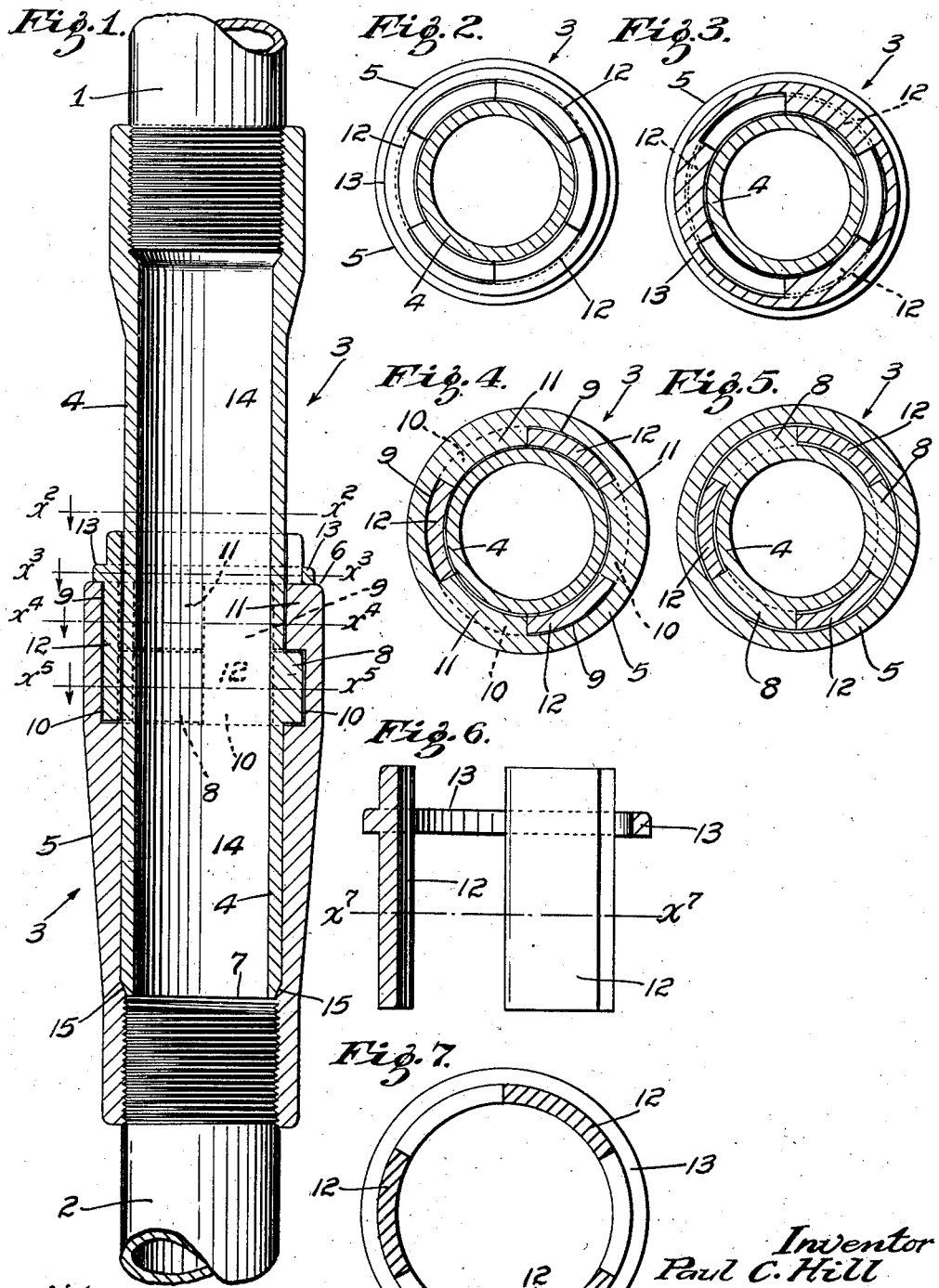

PAUL C. HILL, OF TAFT, CALIFORNIA.

COUPLING.

1,113,556.  Specification of Letters Patent.  Patented Oct. 13, 1914.

Application filed June 10, 1913. Serial No. 772,909.

*To all whom it may concern:*

Be it known that I, PAUL C. HILL, a citizen of the United States, residing at Taft, in the county of Kern and State of California, have invented a new and useful Coupling, of which the following is a specification.

This invention relates to the class of couplings whereby pipe sections or casings of any kind may be united and it is useful in stringing pipe sections together as when oil or water wells are sunk.

The invention can also be used as a quick detachable joint for a rotary drill pipe, but is more particularly for use in wells of any kind where it is necessary to lift the fluid to ground level by means of a pump attached to the bottom of a string of tubing or pipe. In such wells either for water or oil, it is frequently necessary to remove the tubing in order to clean the well, replace worn pump parts, or for several other reasons, and this joint or coupling is adapted when used to cut down the time that the well is non-productive on account of repairs. Such lost time is estimated to be about one-third, more or less, of the time of the well, and this invention is intended to greatly reduce such loss and to absolutely eliminate the wear and tear on the threads of the tubing, which, in the case of ordinary tubing, is very heavy by reason of the frequent screwing up and unscrewing of the threaded joints.

An object of the invention is to make a tight joint in such tubing without the use of threads at the point of coupling.

Among other objects this invention is characterized by the fact that the pipe sections may be very rapidly connected and disconnected, and also by the fact that the coupling is of very rugged construction so that it may be subject to hard usage without perceptibly diminishing its utility.

Still another object of the invention is to provide a simple coupling that can be put in place with great facility and with very little handling.

The accompanying drawings illustrate the invention.

Figure 1 is a longitudinal section through the coupling, and shows it connected to two adjacent pipe sections. Fig. 2 is a transverse section through the coupling on line $x^2$, Fig. 1. Fig. 3 is a transverse section through the coupling on line $x^3$, Fig. 1. Fig. 4 is a transverse section through the coupling on line $x^4$, Fig. 1. Fig. 5 is a transverse section through the coupling on line $x^5$, Fig. 1. Fig. 6 is a longitudinal section through the key means, this element being shown detached from the rest of the coupling. Fig. 7 is a transverse section through the key means on line $x^7$, Fig. 6.

The pipe sections 1 and 2 are connected by the coupling 3. This coupling comprises a male member 4, which is attached to pipe 1, and also the female member 5, which is attached to pipe 2. From the drawing it is seen that the female member embraces the male member for a substantial length extending approximately from the female extremity 6 to the male extremity 7. In between these points the members fit each other nicely so as to mutually support one another and so as to hold their respective axes substantially in alinement with each other. This, of course, keeps the pipe sections well in line with each other and prevents any looseness or wabbling between the successive pipes.

The male member 4 is provided with a series of externally-projecting lugs 8—see Figs. 1 and 5; and the female member 5 is provided with a similar series of longitudinally extending slots 9, Figs. 1 and 4, cut into its inner cylindrical surface. These slots communicate with a circumferentially extending groove 10, which together with slots 9 leaves the shoulders 11, Figs. 1 and 4, extending internally from the female member 5. When the male member enters the female member the lugs 8 pass through slots 9 and enter the groove 10 below. The male member may then be turned somewhat so as to bring the lugs 8 immediately below the similarly-shaped shoulders 11. In this event, the two coupling members are obviously interlocked so far as the longitudinal motion is concerned. At this stage of the coupling action the slots 9 form a continuous opening into the groove 10, as shown at the left, Fig. 1, and certain key means are next inserted into these openings so as to hold or lock the coupling members in their interlocked relation. This key means is shown in detail in Figs. 6 and 7, and is seen to comprise a series of keys or fillers 12 which are held together and made integral by means of the annular band 13 which embraces them. These keys or fillers have the same shape and are of the same size as the slots 9, and being positioned relative to each other in the same manner as slots 9 the keys are adapted to pass through said slots and into the groove 10 as shown in Fig. 1. In this event the lugs 8 cannot be turned back so as to register with, and be drawn out through, the slots 9, but on the contrary the lugs are positively locked and held in their position beneath shoulders 11. Obviously, this positively locks the coupling members in their interlocked position and they cannot be separated, except by withdrawing the key means from the groove 10.

When used for connecting pipes or casings that are intended to conduct fluid, as in oil or water wells, the coupling is, of course, formed with a longitudinally-extending opening 14 so that the fluid may pass through from one pipe section to the next one. In order to prevent leaks at the coupling junction the female and male members may respectively be internally and externally machined and ground at 15, Fig. 1, so as to form a fluid-tight joint.

From the foregoing description the construction and use of this coupling will be clear, and its ruggedness and durability will be apparent from the drawings.

I claim:

1. A three-piece tubular coupling for sections of pipe, said coupling comprising a male member, a female member and a unitary key-member; said female member being adapted to embrace said male member for a substantial length, there being lugs on the exterior of the male member, and longitudinal slots communicating with a circumferentially extending groove cut internally of said female member; said lugs on the male member being adapted to pass through said slots and to be turned into said groove, said key-member having a series of fingers adapted to pass through said slots and into said groove to hold said lugs and groove in interlocking relation.

2. Coupling members for sections of pipe, said coupling members being longitudinally perforate so that liquid may pass through from one pipe section to another, lugs on the exterior of one coupling member; longitudinally extending slots communicating with a circumferentially extending groove on the interior of the second coupling member, said lugs on the first coupling member being adapted to pass through said slots and to be turned either to right or left into said groove; and key means adapted to pass into said slots after said lugs have been turned into said groove.

3. Coupling members for sections of pipe, said coupling members being longitudinally perforate so that liquid may pass through from one section of pipe to the next section of pipe, a series of externally-projecting lugs on one of said coupling members; a series of longitudinally-extending slots cut internally into the second coupling member, said slots communicating with an internally circumferentially extending groove, said slots being spaced apart so as to form internally-projecting shoulders on the second said coupling member, said lugs on the first coupling member being adapted to slide longitudinally through the slots in the second coupling member and to be turned either to right or left into said groove so as to lie beneath said shoulders of the second said member, said lugs and shoulders being thus adapted to interlock the coupling members longitudinally, and a unitary key member having a series of keys adapted to pass through said slots and into said groove so as to hold said lugs and shoulders in interlocked relation.

In testimony whereof, I have hereunto set my hand at Taft, California, this 29 day of May, 1913.

PAUL C. HILL.

In presence of—
  Joseph C. Hier,
  J. F. Lehan.